(12) United States Patent
Kraus

(10) Patent No.: US 10,867,445 B1
(45) Date of Patent: Dec. 15, 2020

(54) CONTENT SEGMENTATION AND NAVIGATION

(71) Applicant: Amazon Technologies, Inc., Reno, NV (US)

(72) Inventor: Holger Kraus, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/353,328

(22) Filed: Nov. 16, 2016

(51) Int. Cl.
| | | |
|---|---|---|
| *G06T 19/00* | (2011.01) | |
| *G06F 3/0346* | (2013.01) | |
| *G06T 15/00* | (2011.01) | |
| *G06F 3/01* | (2006.01) | |
| *G06F 40/117* | (2020.01) | |

(52) U.S. Cl.
CPC ............ *G06T 19/003* (2013.01); *G06F 3/012* (2013.01); *G06F 3/013* (2013.01); *G06F 3/0346* (2013.01); *G06F 40/117* (2020.01); *G06T 15/005* (2013.01); *G06T 19/006* (2013.01)

(58) Field of Classification Search
CPC ........ G06F 3/012; G06F 3/013; G06F 17/218; G06F 3/0346; G06F 40/117; G06T 19/003; G06T 15/005; G06T 19/006
See application file for complete search history.

(56) References Cited

U.S. PATENT DOCUMENTS

| | | | | |
|---|---|---|---|---|
| 5,404,442 A * | 4/1995 | Foster | ................... | G06F 3/0481 715/210 |
| 5,977,935 A * | 11/1999 | Yasukawa | ............ | G02B 27/017 340/980 |
| 6,590,593 B1 * | 7/2003 | Robertson | ............. | G06F 3/0481 715/782 |
| 6,847,336 B1 * | 1/2005 | Lemelson | .............. | G16H 20/40 345/8 |
| 7,577,913 B1 * | 8/2009 | Donoho | ................ | G06F 3/0481 715/757 |
| 7,600,192 B1 * | 10/2009 | Hashimoto | ........... | G06F 3/0482 715/716 |
| 7,937,726 B2 * | 5/2011 | Nashida | ............. | H04N 21/4532 725/46 |
| 8,046,719 B2 * | 10/2011 | Skourup | ................. | G06F 3/011 715/848 |
| 8,692,739 B2 * | 4/2014 | Mathieu | ................. | G02B 27/01 345/7 |
| 8,890,898 B2 * | 11/2014 | Tsai | ........................ | G06F 3/017 345/684 |

(Continued)

*Primary Examiner* — Charles L Beard
(74) *Attorney, Agent, or Firm* — Hogan Lovells US LLP

(57) ABSTRACT

Content can be segmented into selectable sections for use with viewing devices such as virtual reality (VR) or three-dimensional (3D) headsets. Content to be displayed using such a device can be analyzed (dynamically or offline) to identify segments of the content. The content can be identified by, for example, locating existing segmentations, identifying regions having a minimum size, or identifying regions running along edges or full lengths/widths of the content, etc. A user can utilize a single device input to cause any of these sections to become a current focus of the display. As a current focus, the user can navigate, scroll, or otherwise manipulate the content or view within that section. Different types of input (i.e., a single or double tap, or long press) can be used to switch focus, interact with various elements, or perform other such actions.

14 Claims, 8 Drawing Sheets

(56) References Cited

U.S. PATENT DOCUMENTS

| | | | | |
|---|---|---|---|---|
| 8,928,737 B2* | 1/2015 | Christopher | H04N 13/25 | 348/46 |
| 8,947,322 B1* | 2/2015 | Chi | G02B 27/017 | 345/156 |
| 8,992,232 B2* | 3/2015 | Berry | G09B 5/02 | 351/237 |
| 9,043,729 B2* | 5/2015 | Chaudhri | G06F 3/04817 | 715/834 |
| 9,131,158 B2* | 9/2015 | Li | H04N 5/23296 | |
| 9,185,352 B1* | 11/2015 | Jacques | H04N 7/18 | |
| 9,274,340 B2* | 3/2016 | Lyons | G02B 27/017 | |
| 9,311,718 B2* | 4/2016 | Scavezze | G06T 7/20 | |
| 9,378,592 B2* | 6/2016 | Kim | G06F 3/017 | |
| 9,392,212 B1* | 7/2016 | Ross | H04N 5/9305 | |
| 9,448,694 B2* | 9/2016 | Sharma | G06F 3/0486 | |
| 9,575,563 B1* | 2/2017 | Li | G06F 3/017 | |
| 9,609,305 B1* | 3/2017 | Ramaswamy | H04N 13/246 | |
| 9,639,152 B2* | 5/2017 | Locker | G06F 3/04845 | |
| 9,704,250 B1* | 7/2017 | Shah | G06T 7/0065 | |
| 9,727,132 B2* | 8/2017 | Liu | G06F 3/012 | |
| 9,805,695 B2* | 10/2017 | Matsunaga | G09G 5/34 | |
| 9,851,788 B2* | 12/2017 | Kim | G06F 3/04842 | |
| 9,851,792 B2* | 12/2017 | Shanware | G06F 3/013 | |
| 9,892,564 B1* | 2/2018 | Cvetko | A61B 5/0071 | |
| 9,898,863 B2* | 2/2018 | Miyazaya | H04R 5/033 | |
| 9,898,868 B2* | 2/2018 | Aonuma | G02B 27/0172 | |
| 9,971,491 B2* | 5/2018 | Schwesinger | G06F 3/017 | |
| 10,025,376 B2* | 7/2018 | Shanware | G06F 3/011 | |
| 10,120,451 B1* | 11/2018 | Fram | G06F 3/017 | |
| 10,156,977 B2* | 12/2018 | Kim | G04G 9/0064 | |
| 10,194,259 B1* | 1/2019 | Martin | G06F 3/04842 | |
| 10,217,488 B1* | 2/2019 | Huang | G06T 3/4038 | |
| 10,229,541 B2* | 3/2019 | Perry | G02B 27/017 | |
| 10,242,476 B2* | 3/2019 | Bastaldo-Tsampalis | G06T 19/006 | |
| 10,308,371 B1* | 6/2019 | Tiana | B64D 45/08 | |
| 10,339,382 B2* | 7/2019 | Solomin | G02B 27/017 | |
| 10,368,802 B2* | 8/2019 | Klappert | H04N 21/6582 | |
| 10,628,994 B2* | 4/2020 | Peli | G06F 3/012 | |
| 10,636,212 B2* | 4/2020 | Tamaoki | G06T 19/006 | |
| 10,657,667 B2* | 5/2020 | Pio | H04N 21/816 | |
| 10,657,702 B2* | 5/2020 | Pio | G06F 3/011 | |
| 10,684,467 B2* | 6/2020 | Gibbs | A63F 13/213 | |
| 10,712,899 B2* | 7/2020 | McBeth | G02B 27/0093 | |
| 10,732,818 B2* | 8/2020 | Won | G06F 3/0485 | |
| 2002/0091739 A1* | 7/2002 | Ferlitsch | G06F 3/04815 | 715/273 |
| 2004/0017939 A1* | 1/2004 | Mehrotra | H04N 19/14 | 382/173 |
| 2005/0264527 A1* | 12/2005 | Lin | G06F 3/011 | 345/156 |
| 2006/0061544 A1* | 3/2006 | Min | G02B 27/0093 | 345/156 |
| 2007/0189737 A1* | 8/2007 | Chaudhri | H04N 21/43615 | 386/234 |
| 2007/0209586 A1* | 9/2007 | Ebensberger | G09B 9/00 | 118/682 |
| 2007/0236493 A1* | 10/2007 | Horiuchi | H04N 13/341 | 345/419 |
| 2009/0292671 A1* | 11/2009 | Ramig | G06F 1/1626 | |
| 2010/0005419 A1* | 1/2010 | Miichi | G06F 3/0362 | 715/828 |
| 2010/0125816 A1* | 5/2010 | Bezos | G06F 1/1626 | 715/863 |
| 2010/0188432 A1* | 7/2010 | Tsai | G06F 3/017 | 345/684 |
| 2010/0205667 A1* | 8/2010 | Anderson | G06F 21/84 | 726/19 |
| 2010/0248787 A1* | 9/2010 | Smuga | G06F 3/0482 | 455/566 |
| 2010/0289753 A1* | 11/2010 | Coddington | G06F 3/04886 | 345/173 |
| 2011/0047306 A1* | 2/2011 | Dickens | G06F 3/1446 | 710/73 |
| 2011/0145718 A1* | 6/2011 | Ketola | G06F 3/0346 | 715/739 |
| 2012/0019708 A1* | 1/2012 | Morihisa | G02B 7/30 | 348/348 |
| 2012/0050267 A1* | 3/2012 | Seo | H04N 21/431 | 345/419 |
| 2012/0124515 A1* | 5/2012 | Li | G06F 3/0482 | 715/808 |
| 2012/0131441 A1* | 5/2012 | Jitkoff | G06F 3/04817 | 715/234 |
| 2012/0185798 A1* | 7/2012 | Louch | G06F 3/0481 | 715/796 |
| 2012/0249587 A1* | 10/2012 | Anderson | G06F 3/04895 | 345/633 |
| 2012/0274745 A1* | 11/2012 | Russell | H04N 13/025 | 348/46 |
| 2012/0278764 A1* | 11/2012 | Arriola | G06F 16/44 | 715/835 |
| 2012/0284673 A1* | 11/2012 | Lamb | G06F 3/04883 | 715/863 |
| 2012/0293406 A1* | 11/2012 | Park | G06F 1/1626 | 345/156 |
| 2012/0324357 A1* | 12/2012 | Viegers | G06F 16/4393 | 715/730 |
| 2013/0019182 A1* | 1/2013 | Gil | G06F 3/0482 | 715/738 |
| 2013/0097557 A1* | 4/2013 | Madau | G06K 9/00845 | 715/810 |
| 2013/0147687 A1* | 6/2013 | Small | G09G 5/00 | 345/8 |
| 2013/0176212 A1* | 7/2013 | Nan | G06F 3/0481 | 345/157 |
| 2013/0179781 A1* | 7/2013 | Nan | G06F 3/04812 | 715/711 |
| 2013/0208014 A1* | 8/2013 | Fleck | G06K 9/00684 | 345/672 |
| 2013/0300760 A1* | 11/2013 | Sugano | G06T 11/60 | 345/592 |
| 2013/0314341 A1* | 11/2013 | Lee | G06F 3/0481 | 345/173 |
| 2013/0321403 A1* | 12/2013 | Piemonte | G06T 15/00 | 345/419 |
| 2013/0335301 A1* | 12/2013 | Wong | G02B 27/0093 | 345/8 |
| 2013/0335303 A1* | 12/2013 | Maciocci | G06F 3/011 | 345/8 |
| 2014/0002352 A1* | 1/2014 | Jacob | G09G 5/00 | 345/156 |
| 2014/0063060 A1* | 3/2014 | Maciocci | G06F 3/011 | 345/633 |
| 2014/0068475 A1* | 3/2014 | Li | G06F 16/95 | 715/765 |
| 2014/0176663 A1* | 6/2014 | Cutler | G06T 7/50 | 348/14.07 |
| 2014/0237495 A1* | 8/2014 | Jang | H04N 21/44218 | 725/12 |
| 2014/0267803 A1* | 9/2014 | Shintani | H04N 5/23296 | 348/208.2 |
| 2014/0337740 A1* | 11/2014 | Kwon | G06F 3/04817 | 715/728 |
| 2014/0354515 A1* | 12/2014 | LaValle | G02B 27/017 | 345/8 |
| 2014/0368442 A1* | 12/2014 | Vahtola | G06F 3/013 | 345/173 |
| 2015/0035822 A1* | 2/2015 | Arsan | G06T 19/006 | 345/419 |
| 2015/0054826 A1* | 2/2015 | Varga | F41G 3/04 | 345/421 |
| 2015/0077326 A1* | 3/2015 | Kramer | G06F 3/0325 | 345/156 |
| 2015/0089337 A1* | 3/2015 | Grady | G06T 19/00 | 715/202 |
| 2015/0089381 A1* | 3/2015 | Shao | G06F 3/013 | 715/740 |

(56) References Cited

U.S. PATENT DOCUMENTS

| | | | |
|---|---|---|---|
| 2015/0103003 A1* | 4/2015 | Kerr | G06F 3/013 345/158 |
| 2015/0143297 A1* | 5/2015 | Wheeler | G06F 3/0485 715/830 |
| 2015/0193018 A1* | 7/2015 | Venable | G06F 3/0346 345/158 |
| 2015/0206321 A1* | 7/2015 | Scavezze | G06T 7/20 345/633 |
| 2015/0248198 A1* | 9/2015 | Somlai-Fisher | G06F 3/0481 715/716 |
| 2015/0248785 A1* | 9/2015 | Holmquist | G06T 19/006 345/419 |
| 2015/0262428 A1* | 9/2015 | Tatzgern | G06T 11/00 345/633 |
| 2015/0293663 A1* | 10/2015 | Kono | G06F 3/04847 715/783 |
| 2015/0309705 A1* | 10/2015 | Keeler | G06N 7/005 705/27.2 |
| 2015/0317836 A1* | 11/2015 | Beaurepaire | G09G 5/14 345/634 |
| 2015/0331238 A1* | 11/2015 | Roth | G06F 3/0481 348/115 |
| 2015/0331240 A1* | 11/2015 | Poulos | G02B 27/017 345/8 |
| 2015/0331588 A1* | 11/2015 | Ishida | G06F 40/166 715/765 |
| 2015/0338915 A1* | 11/2015 | Publicover | H04N 5/44504 345/633 |
| 2015/0346813 A1* | 12/2015 | Vargas | G06F 3/012 345/8 |
| 2016/0004339 A1* | 1/2016 | Koara | G06F 3/0488 345/173 |
| 2016/0033768 A1* | 2/2016 | Pedrotti | G02B 27/0149 345/8 |
| 2016/0035074 A1* | 2/2016 | Jeong | G06T 3/40 382/282 |
| 2016/0048230 A1* | 2/2016 | Shimoda | H04N 13/004 345/633 |
| 2016/0071320 A1* | 3/2016 | Smith | G02B 27/017 345/633 |
| 2016/0086379 A1* | 3/2016 | Sadi | G06F 3/167 345/633 |
| 2016/0110901 A1* | 4/2016 | Connolly | G06T 11/60 345/661 |
| 2016/0131908 A1* | 5/2016 | Fateh | G06F 3/147 345/633 |
| 2016/0170481 A1* | 6/2016 | Fateh | G06F 3/03547 345/174 |
| 2016/0217612 A1* | 7/2016 | Petill | G06T 19/006 |
| 2016/0225192 A1* | 8/2016 | Jones | G06F 3/012 |
| 2016/0231819 A1* | 8/2016 | Chavez | G06F 3/016 |
| 2016/0282619 A1* | 9/2016 | Oto | G02B 27/017 |
| 2016/0309090 A1* | 10/2016 | Park | H04N 5/23293 |
| 2016/0313902 A1* | 10/2016 | Hill | G06F 3/04847 |
| 2016/0321841 A1* | 11/2016 | Christen | G06T 19/006 |
| 2016/0328108 A1* | 11/2016 | Li | G06F 3/0485 |
| 2016/0357017 A1* | 12/2016 | Nishidate | G06F 3/012 |
| 2016/0363767 A1* | 12/2016 | Osborn | G02B 27/0172 |
| 2017/0011557 A1* | 1/2017 | Lee | G06F 3/013 |
| 2017/0038837 A1* | 2/2017 | Faaborg | G06F 3/0482 |
| 2017/0052507 A1* | 2/2017 | Poulos | G06F 3/00 |
| 2017/0052595 A1* | 2/2017 | Poulos | G02B 27/0103 |
| 2017/0060381 A1* | 3/2017 | Hanada | G06F 3/0482 |
| 2017/0075117 A1* | 3/2017 | Lin | G06F 3/147 |
| 2017/0075640 A1* | 3/2017 | Chun | G06F 3/04847 |
| 2017/0092002 A1* | 3/2017 | Mullins | G06F 3/013 |
| 2017/0092235 A1* | 3/2017 | Osman | G06F 3/012 |
| 2017/0097807 A1* | 4/2017 | Park | G06F 3/016 |
| 2017/0108936 A1* | 4/2017 | Feinstein | G06F 3/0485 |
| 2017/0123487 A1* | 5/2017 | Hazra | G06F 3/015 |
| 2017/0139474 A1* | 5/2017 | Rochford | G06F 3/011 |
| 2017/0146997 A1* | 5/2017 | Bear | G05D 1/0038 |
| 2017/0147160 A1* | 5/2017 | Snyder | G06F 3/04842 |
| 2017/0160812 A1* | 6/2017 | Park | G06F 21/00 |
| 2017/0169610 A1* | 6/2017 | King | G06T 19/006 |
| 2017/0178298 A1* | 6/2017 | Bonnier | G06T 5/003 |
| 2017/0192637 A1* | 7/2017 | Ren | G01C 21/3694 |
| 2017/0200310 A1* | 7/2017 | Kapinos | G06T 19/003 |
| 2017/0221185 A1* | 8/2017 | Inomata | G06T 5/002 |
| 2017/0221264 A1* | 8/2017 | Perry | H04N 13/344 |
| 2017/0221265 A1* | 8/2017 | Lin | G06T 19/006 |
| 2017/0228922 A1* | 8/2017 | Kaeser | G06F 3/04815 |
| 2017/0249076 A1* | 8/2017 | Smith | G06F 3/04847 |
| 2017/0251204 A1* | 8/2017 | Gupte | H04N 19/154 |
| 2017/0256096 A1* | 9/2017 | Faaborg | G06T 19/20 |
| 2017/0262049 A1* | 9/2017 | Kim | G06F 3/012 |
| 2017/0266554 A1* | 9/2017 | Marks | A63F 13/352 |
| 2017/0272838 A1* | 9/2017 | Glazer | H04N 21/8146 |
| 2017/0278486 A1* | 9/2017 | Ishikawa | G09G 5/00 |
| 2017/0278546 A1* | 9/2017 | Xiao | G11B 27/031 |
| 2017/0285737 A1* | 10/2017 | Khalid | G06F 3/013 |
| 2017/0287194 A1* | 10/2017 | Katz | G06T 7/00 |
| 2017/0287215 A1* | 10/2017 | Lalonde | G02B 27/017 |
| 2017/0315612 A1* | 11/2017 | Shanware | G06F 3/013 |
| 2017/0323479 A1* | 11/2017 | Mokuya | G06T 19/003 |
| 2017/0329397 A1* | 11/2017 | Lin | G06F 3/013 |
| 2017/0329419 A1* | 11/2017 | Dearman | G06F 3/0346 |
| 2017/0330034 A1* | 11/2017 | Wang | G05D 1/0088 |
| 2017/0336882 A1* | 11/2017 | Tome | G06F 3/011 |
| 2017/0337035 A1* | 11/2017 | Choudhary | G06F 3/0481 |
| 2017/0337743 A1* | 11/2017 | Metzler | G06T 7/73 |
| 2017/0344204 A1* | 11/2017 | Geller | G06F 3/0483 |
| 2017/0344205 A1* | 11/2017 | Geller | G06F 3/0483 |
| 2017/0345192 A1* | 11/2017 | Geller | G06T 11/40 |
| 2017/0351397 A1* | 12/2017 | Won | G06F 3/046 |
| 2017/0354864 A1* | 12/2017 | Rogers | A63F 13/213 |
| 2017/0354883 A1* | 12/2017 | Benedetto | A63F 13/533 |
| 2017/0364153 A1* | 12/2017 | Kazansky | G06F 3/015 |
| 2017/0367766 A1* | 12/2017 | Mahfouz | A61B 34/10 |
| 2018/0005444 A1* | 1/2018 | Mullins | G06T 19/006 |
| 2018/0046363 A1* | 2/2018 | Miller | G06F 3/017 |
| 2018/0059809 A1* | 3/2018 | McClendon | G06F 3/0346 |
| 2018/0061132 A1* | 3/2018 | Lanier | G06F 3/013 |
| 2018/0075655 A1* | 3/2018 | Cabanier | G06F 3/012 |
| 2018/0078422 A1* | 3/2018 | Dierenbach | A61F 11/045 |
| 2018/0081520 A1* | 3/2018 | Han | G06F 3/04815 |
| 2018/0095616 A1* | 4/2018 | Valdivia | H04L 51/16 |
| 2018/0095634 A1* | 4/2018 | Alexander | G06F 3/0346 |
| 2018/0095635 A1* | 4/2018 | Valdivia | G02B 27/0093 |
| 2018/0095636 A1* | 4/2018 | Valdivia | G06F 3/04815 |
| 2018/0096507 A1* | 4/2018 | Valdivia | G06F 1/163 |
| 2018/0136744 A1* | 5/2018 | Karlsson | G06F 3/011 |
| 2018/0164588 A1* | 6/2018 | Leppanen | G06F 3/012 |
| 2018/0164876 A1* | 6/2018 | Smit | G06F 3/04815 |
| 2018/0181065 A1* | 6/2018 | An | G03H 1/2205 |
| 2018/0181080 A1* | 6/2018 | Imamura | G01S 19/14 |
| 2018/0181264 A1* | 6/2018 | Jhawar | G06F 1/163 |
| 2018/0181810 A1* | 6/2018 | Jhawar | G06F 3/012 |
| 2018/0189568 A1* | 7/2018 | Powderly | G06T 7/70 |
| 2018/0190388 A1* | 7/2018 | Mezrich | G06F 3/0487 |
| 2018/0192031 A1* | 7/2018 | Hardison | G02B 27/2228 |
| 2018/0218538 A1* | 8/2018 | Short | G06T 19/006 |
| 2018/0239515 A1* | 8/2018 | Cooper | G06F 3/012 |
| 2018/0253900 A1* | 9/2018 | Finding | G06T 19/006 |
| 2018/0275837 A1* | 9/2018 | Getz | G02B 27/017 |
| 2018/0278993 A1* | 9/2018 | Crisler | G02B 27/0093 |
| 2018/0284885 A1* | 10/2018 | Kim | G06F 3/013 |
| 2018/0299963 A1* | 10/2018 | Fukazawa | G06F 3/16 |
| 2018/0300897 A1* | 10/2018 | Woods | G06F 3/011 |
| 2018/0310010 A1* | 10/2018 | Hourunranta | H04N 19/597 |
| 2018/0322706 A1* | 11/2018 | Drouin | G06T 19/006 |
| 2018/0332219 A1* | 11/2018 | Corcoran | H04N 5/23267 |
| 2018/0335921 A1* | 11/2018 | Karunamuni | G06F 3/0485 |
| 2018/0335937 A1* | 11/2018 | Hauenstein | G06F 3/016 |
| 2018/0335939 A1* | 11/2018 | Karunamuni | G06F 3/0481 |
| 2018/0342103 A1* | 11/2018 | Schwarz | G06T 19/006 |
| 2018/0348969 A1* | 12/2018 | Kawamura | G06F 3/04812 |
| 2019/0005717 A1* | 1/2019 | Singh | G06F 3/017 |
| 2019/0018236 A1* | 1/2019 | Perreault | G06F 3/013 |
| 2019/0051055 A1* | 2/2019 | Leppanen | G06F 3/017 |
| 2019/0056907 A1* | 2/2019 | So | H04W 8/005 |
| 2019/0068529 A1* | 2/2019 | Mullins | H04L 51/046 |

(56) References Cited

U.S. PATENT DOCUMENTS

| | | | |
|---|---|---|---|
| 2019/0082118 A1* | 3/2019 | Wang | G06T 7/13 |
| 2019/0095068 A1* | 3/2019 | Suzuki | G06F 3/0346 |
| 2019/0129179 A1* | 5/2019 | Inoue | G06F 3/011 |
| 2019/0139312 A1* | 5/2019 | Leppanen | G06F 3/0486 |
| 2019/0139426 A1* | 5/2019 | Kesavadas | G09B 5/02 |
| 2019/0197785 A1* | 6/2019 | Tate-Gans | G06T 19/006 |
| 2019/0205003 A1* | 7/2019 | Kim | G06F 3/011 |
| 2019/0212827 A1* | 7/2019 | Kin | G02B 27/0179 |
| 2019/0227641 A1* | 7/2019 | Douglas | G06F 3/03543 |
| 2019/0236844 A1* | 8/2019 | Balasian | G06F 3/011 |
| 2019/0237044 A1* | 8/2019 | Day | G09G 5/08 |
| 2019/0243445 A1* | 8/2019 | Kuwatani | G06F 3/017 |
| 2019/0258320 A1* | 8/2019 | Yang | G06F 3/017 |
| 2019/0304406 A1* | 10/2019 | Griswold | G06T 19/00 |
| 2019/0339855 A1* | 11/2019 | Walkin | G06F 3/0485 |
| 2019/0346994 A1* | 11/2019 | Bastide | G06F 3/04845 |
| 2019/0347771 A1* | 11/2019 | Suszek | G06T 5/002 |
| 2019/0362555 A1* | 11/2019 | Chen | H04N 21/4318 |
| 2020/0057555 A1* | 2/2020 | Walkin | G06F 3/04883 |
| 2020/0082791 A1* | 3/2020 | Petrie | G06F 3/013 |
| 2020/0160606 A1* | 5/2020 | Marshall | G02B 27/017 |

\* cited by examiner

US 10,867,445 B1

CONTENT SEGMENTATION AND NAVIGATION

BACKGROUND

Users are increasingly accessing digital content in new and interesting ways. One way of accessing content that is becoming more prevalent relates to the viewing of content through a virtual reality (VR) headset, three dimensional (3D) display headset, or other such device. While expensive and complex options exist, many of the more accessible devices offer limited control functionality. For example, some virtual reality devices utilize smart phones as a display component and may offer only a single user input. Due to the single input, the ability to navigate content displays such as webpages is limited, which can be frustrating for users and less than optimal for content providers who want users to be able to access their content.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments enable content to be segmented into selectable sections for use with viewing devices such as virtual reality (VR) or three-dimensional (3D) headsets. In various embodiments, content to be displayed using such a device can be analyzed (dynamically or offline) to identify segments of the content. The content can be identified in a number of different ways, such as by looking for existing segmentations, identifying regions having a minimum size, identifying regions running along edges or full lengths/widths of the content, etc. A user wearing or otherwise utilizing one of the display devices can utilize a single input to cause any of these sections to become a current focus for the display. As a current focus, the user can navigate, scroll, or otherwise manipulate the content or view within that section. The selection can be performed using only a single input mechanism in various embodiments, and different types of input can be used to switch focus, interact with various elements, or perform other such actions.

Various other functions and advantages are described and suggested below as may be provided in accordance with the various embodiments.

Figure 1A:
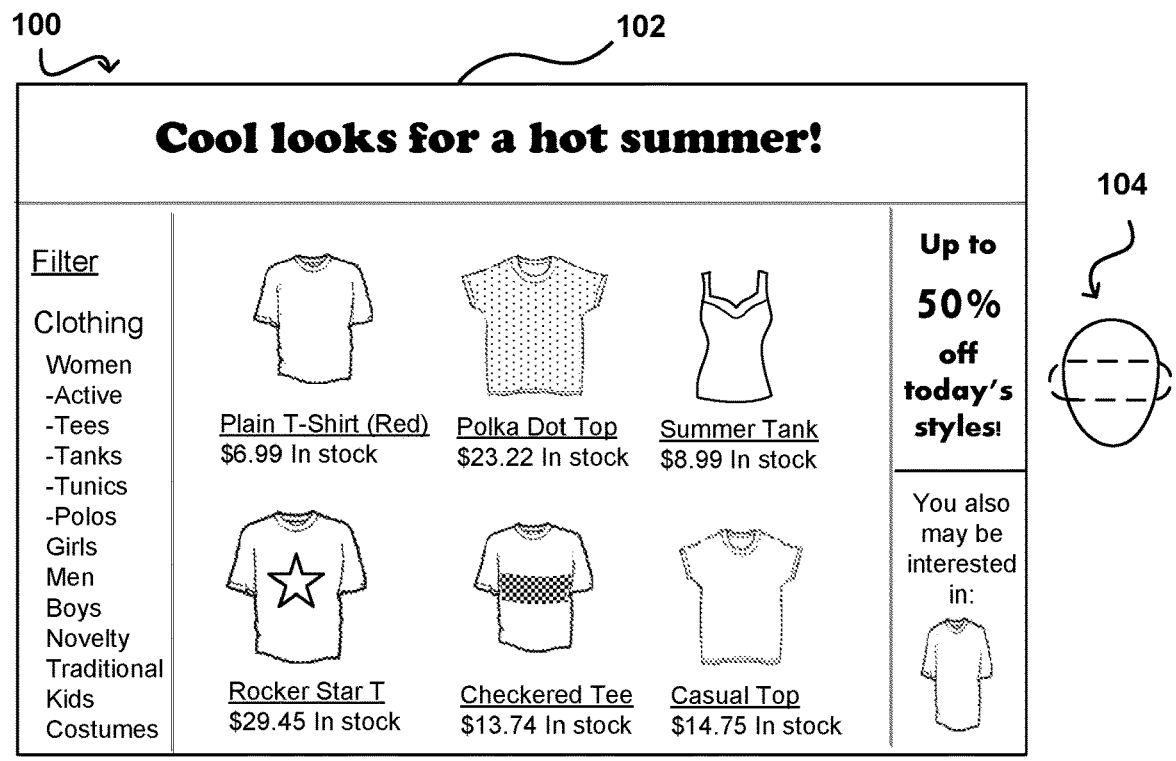
FIGS. 1A and 1B illustrate example displays of content that can be presented in accordance with various embodiments.
Figure 1B:
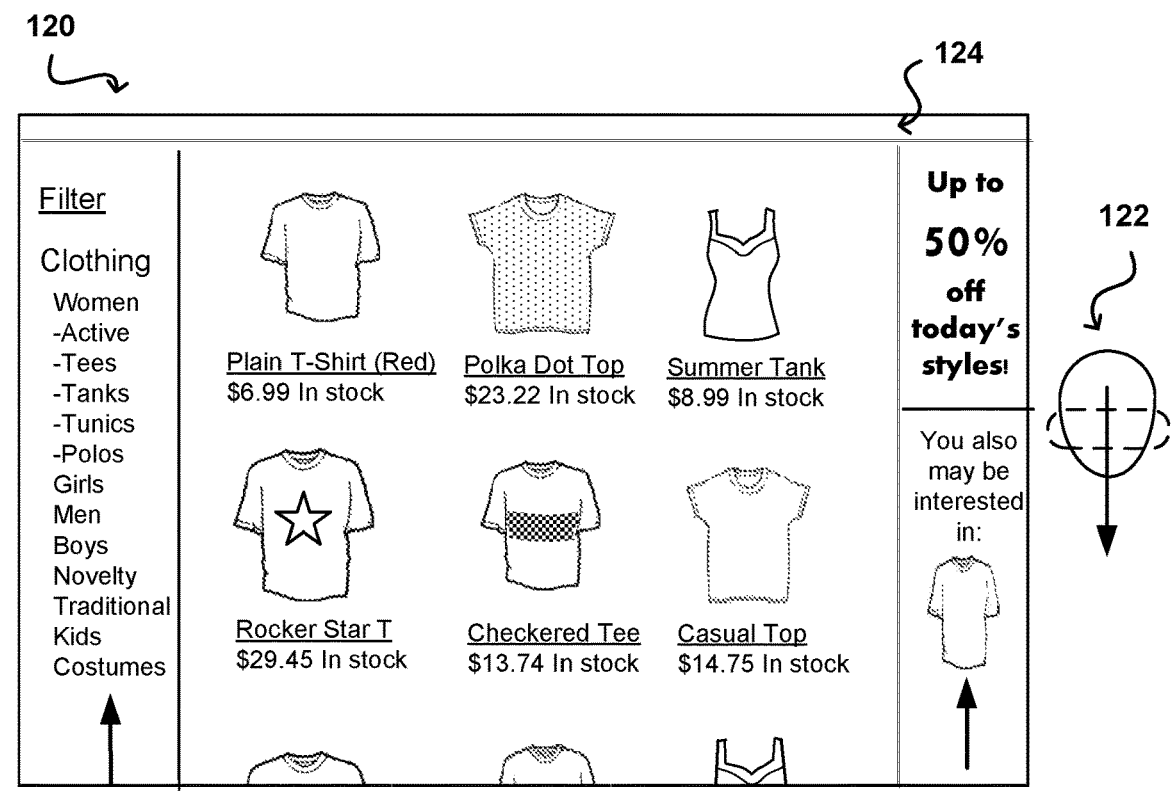

FIGS. 1A and 1B illustrate example displays that can be presented in accordance with various embodiments. Although webpages are displayed in this example, it should be understood that various other types of content can be displayed as well and utilized within the scope of the various embodiments. In the example 100 of FIG. 1A, a first portion 100 of a webpage is displayed, such as through a browser application of a computing device. In this example, the content may be obtained, processed, and rendered on a computing device, such as a smartphone or tablet computer, but the display in this example is presented via a sectioned display, or pair of displays, of a virtual reality (VR) headset, such as is displayed in a normal orientation 104 in FIG. 1A. In typical operation, a user will start with the VR headset in a default orientation, such as with a primary plane of the display screen in a substantially vertical orientation, although various other default orientations can be used as well depending upon factors such as user preference and physical orientation. The content will also typically have a default starting location, which for webpages may be at the top of the page, but could be at a center or other point for various other types or instances of content.

As known for many webpages, the page 102 displayed in FIG. 1A includes a plurality of different areas that each display a different type of content. These can include, for example, frames of content that are each obtained from a different location, as may be associated with a different URL or other such locator or address. For example, a top frame may include a banner advertisement or introductory content, a left hand frame or panel might include navigational links, two or more right hand panels or frames might include advertising or promotional content, and a central or primary frame or panel might include primary content of the page, as may be of primary interest to a user browsing the web content. It should be understood that various other orientations and selections can be used as well for various other types or instances of content.

When using a VR headset to navigate content, a primary navigational tool is the physical orientation of the headset. As discussed in more detail elsewhere herein, a virtual reality headset can utilize various sensors to determine changes in orientation, which can correspond to a change in the viewing direction of a user. While a user can still move his or her eyes at a given location, a vector orthogonal to a plane of the VR display can be considered the primary viewing direction for purposes of rendering and/or displaying content via the headset. When a user wants to scroll or navigate down the page, the user can tilt his or her head down (or up depending upon inversion settings) to a lower orientation 122 in order to cause the content to scroll up, or otherwise enable a "lower" portion to be displayed, as illustrated in the example display of FIG. 1B. As illustrated, however, the entire page scrolls with the change in orientation of the VR headset. While this may be acceptable for certain types of content, in other instances the user may want to be able to have content in one frame remain visible while navigating in another frame. For example, in a conventional webpage displayed on a computer the user can cause just the primary content to scroll, while leaving one or more of the other frames visible, or can have the option of having the entire content scroll. Many existing VR headsets have limited input capability, however, such that the navigational options are similarly limited.

For example, various existing headsets have only a single button input to go along with the change in orientation of the headset. Some headsets will display a cursor or marker corresponding to the primary view location, such that a user can select an option or element by causing the cursor to be displayed at a location associated with the element to be selected, such as by moving the user's head to change the orientation of the VR headset, and can then select the single input to make the selection. Such an input is typically used for options such as to select a button or tab on an interface. Thus, the experience in many instances is still primarily based on viewing and interacting with content such as a website as a whole, single entity, instead of enabling the user to concentrate, interact, and/or control only those sections that are of particular interest to the user. While some browsers and interfaces provide for more customized interaction and control, many applications provide minimal navigational support at best. Interaction with content such as websites can be tedious, as actions such as zooming or scrolling particular sections or sub-elements remains nearly impossible with the widespread single-button input variants of these VR or 3D headsets. While some devices provide better input and can thus make tasks like scrolling easier, they are not widely accessible to the general public due to their high price point.

Accordingly, approaches in accordance with various embodiments provide for the ability to navigate between sections of content using a single input, and then navigate within that section using one or more motion or orientation sensors that detect motion of the user, among other such mechanisms. The content to be displayed can be analyzed to determine the areas or regions to be segmented into navigable content segments, and in at least some embodiments the sections can have an ordering applied such that the user can cycle through the sections by pressing the single input. In some embodiments the user can provide another input as well, such as to double-tap the single input, in order to back out of the section to the content as a whole. Various other segmenting and navigation options are provided as well within the scope of the various embodiments. Such approaches can be used with single focus websites, such as streaming video sites, as well as more websites with complex layouts, which currently corresponds to a majority of the World Wide Web.

Figure 2A:
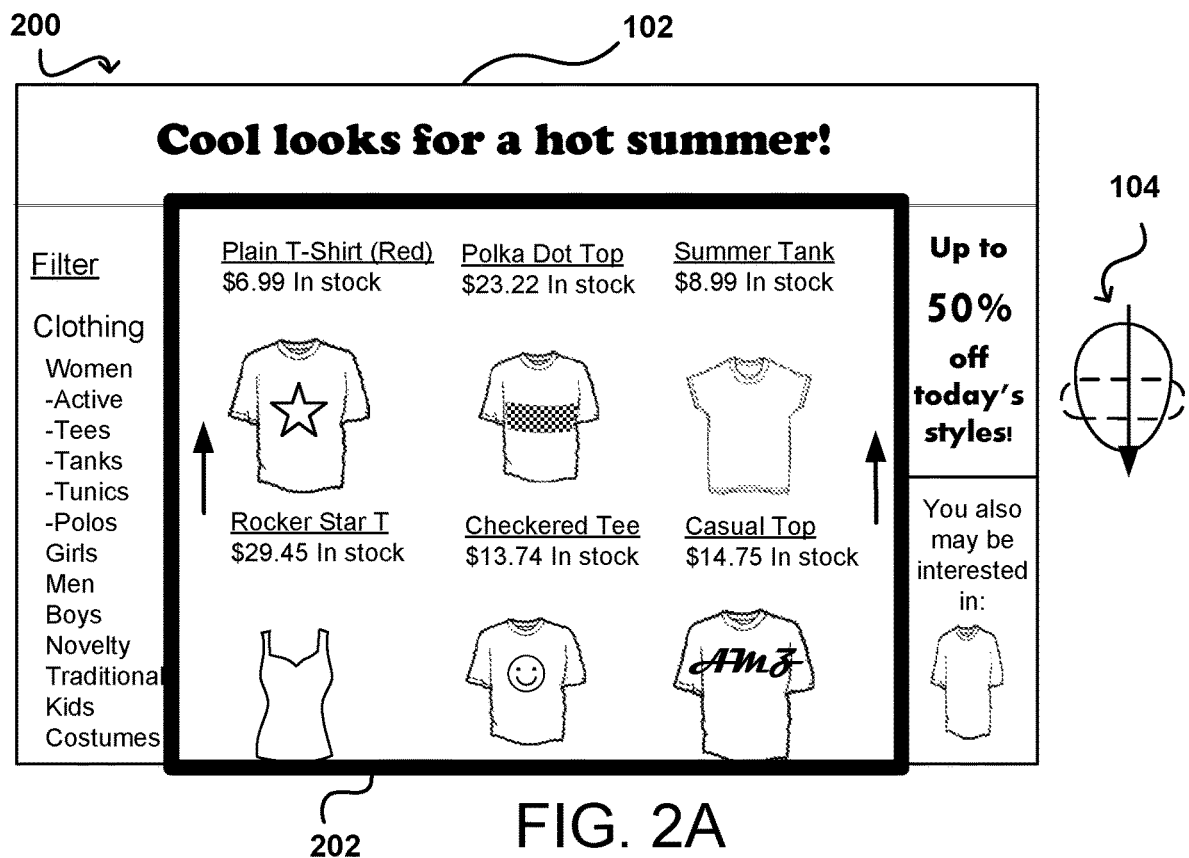
FIGS. 2A and 2B illustrate example displays of content that can be presented in accordance with various embodiments.

FIG. 2A illustrates an example display 200 that can be provided in accordance with various embodiments. For reference, this corresponds to the same webpage illustrated in a default initial configuration in FIG. 1A. In this example, content for the page (i.e., the HTML, DOM, or other such layout code or script) is analyzed to segment the page into navigable sections. In this example the sections can correspond to the header frame (top), navigation frame (left), advertising frames (right), and primary frame (center). Various other sectionings could be utilized or determined as well within the scope of the various embodiments. Further, in some embodiments a user may have an ability to hold the single input for a period of time or provide another such input in order to adjust a selection or granularity of the sectioning, among other such options. In this example, the user has provided one or more selections of the single input button in order to cause a primary content section 202 (highlighted by the thicker border) to be a section of current focus. When the user adjusts his or her head, thereby changing an orientation 104 of the headset, the corresponding motion can cause the content in the section of current focus 202 to scroll or otherwise update in a direction (or other action) corresponding to the direction, amount, and/or rate of motion. In this way, the content from the other sections can remain in view or otherwise not be updated with the navigation of the section of current focus 202. If the user wants to change the focus to another section, the user can select the single input to cycle the focus to the next section.

Figure 2B:
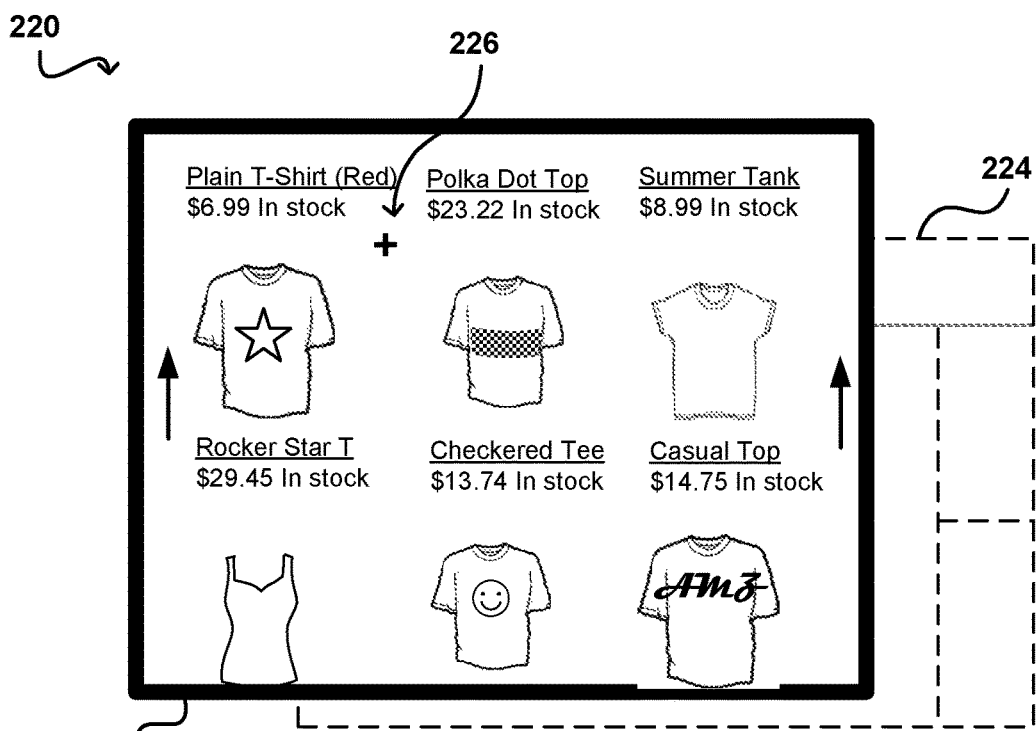

In some embodiments a border or other indicator can be displayed as illustrated in FIG. 2A in order to provide visual indication of the current section of focus. In some embodiments other visual representations can be generated. For example, in the display 220 of FIG. 2B the section of current focus 222 can be rendered to appear to be brought forward and/or the other sections 224 rendered to appear to fall backward in space in order to bring the section of current focus into primary display. The user thus can interact primarily with the section of current focus, and can provide an input such as a double tap of the single input to cause the sections to all be rejoined to a similar plane or grouping. As mentioned, a cursor 226 or view location can be provided as well, which can be translated within the section of current focus in response to changes in orientation of the headset, among other such options. By providing the user with a focus pointer, such as a crosshair or cursor, the user can be enabled to easily bring an element into, or out of, focus. In a state where no element is focused, a click on the single input mechanism can cause one of the elements to be highlighted or otherwise brought into focus. Using the single input button again while a section is in focus can cause the focus to change to another section in some embodiments, or can enable the user to simulate a click on the website using the cursor. In some embodiments the user will double-tap the control to take input from the current section, then single tap to bring another section into focus, as may correspond to the cursor position or a cycle order, among other such options. While focused, the user can use familiar head movement controls to navigate and scroll the focused content without having to worry about getting distracted by unwanted (unfocused) elements. In some embodiments the interaction can be altered instead by rearranging the focused content onto a wider perspective, such as by wrapping it into a fixed height span. For example, the highlighted section 222 in FIG. 2B could be expanded and potentially rendered to appear to wrap around the user. Such an approach can make sure the user doesn't have to scroll at all and can instead utilize the large x-axis (or other) angle to explore the content instead. Since the user can be unaware of the actual location they are facing, this can be used to let the user "overscroll" even beyond 360 degrees, creating an infinite canvas in case the website is large enough. The browser in some embodiments can then just track rotation from the original head position.

In order to provide for focusing on specific sections, approaches in accordance with various embodiments can attempt to dynamically determine the sectioning, such as around the time of rendering. In some embodiments the sectioning might be built into the content or otherwise determined offline. Such sectioning can be used at least as a default sectioning, with some embodiments enabling the user to adjust the granularity of the sectioning as discussed elsewhere herein. For example, a new tag, node, or header can be utilized in the content, such as in the DOM or HTML for a webpage, to indicate specific sections, as well as potentially a cycle order for those sections. In some embodiments an offline analysis of a webpage can be performed to inject such elements into the code or document for the page. In some embodiments the coordinates of the DOM elements can be analyzed to determine the relative sizes of various regions or areas of the page, and any region of at least a minimum size might be selected as a selectable section. The minimum size might be based upon various factors, such as the type of content or display, and in some embodiments can be set or adjustable based upon user preference or input. If a user adjusts a granularity of the sectioning, this can correspond to a change in the minimum section size, and a dynamic redetermination of the sections can be performed in response thereto. Other document or content elements can be used to determining sectioning as well, as may refer to frames, panels, or other types of segmentation or region designations utilized with such content.

Figure 3A:
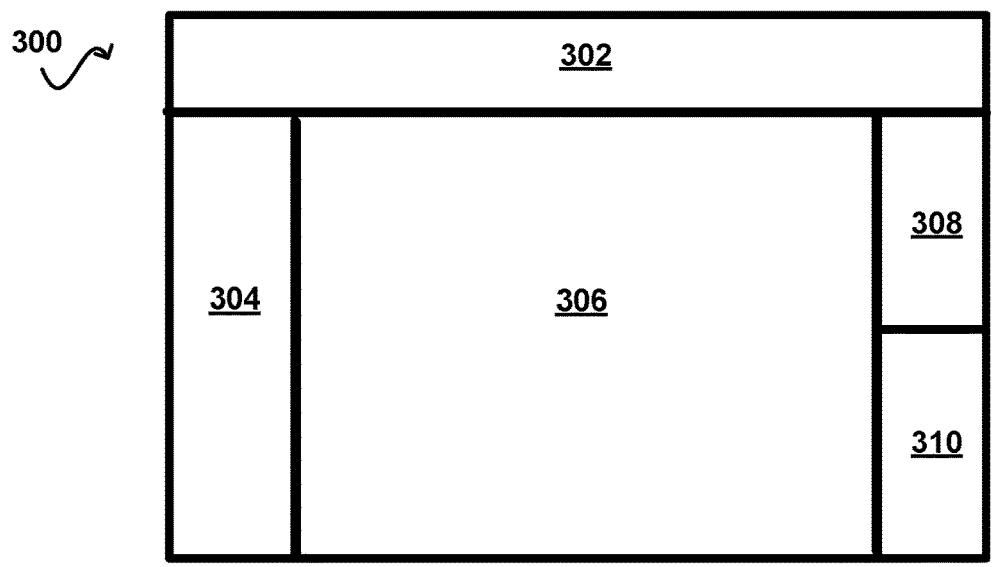
FIGS. 3A, 3B, 3C, 3D, and 3E illustrate an example approach for sectioning content that can be utilized in accordance with various embodiments.
Figure 3B:
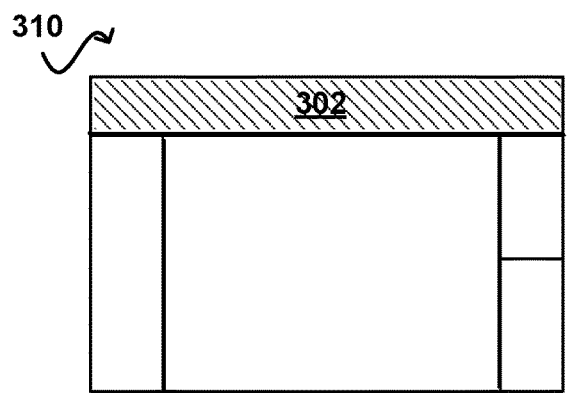
Figure 3C:
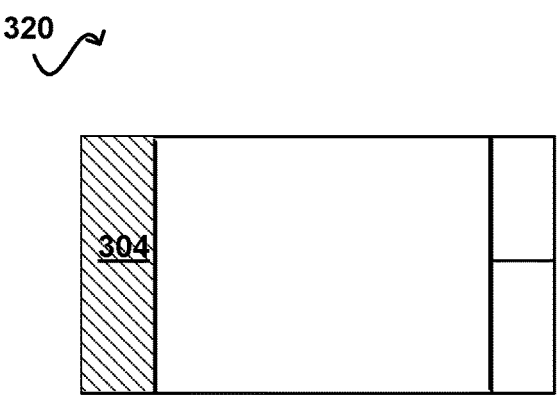
Figure 3D:
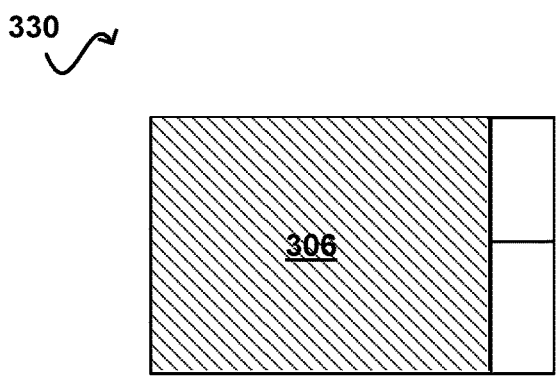
Figure 3E:
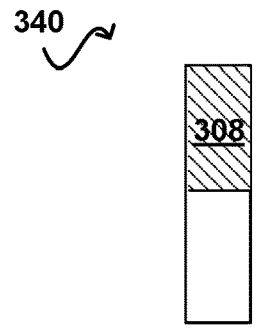

In other embodiments a dynamic content analysis can split the content (e.g., webpage) into several relatively large sections based upon the layout or positioning of the content. For example, an element that is determined to fill most of one axis of the screen (x, y, or potentially z) can be designated as section. For example, consider the page layout 300 illustrated in FIG. 3A. This corresponds to the example layout of FIG. 1A, but is content independent. It should be noted, however, that the type(s) of content in a section can be utilized with the sectioning determination as well as discussed and suggested elsewhere herein. In this example, a first analysis can be performed that determines that one of the elements (302) runs across an entire dimension, here running across the entire x-axis of the layout. Further indicating the value as a potential section, the element 302 can be identified as an edge element as discussed elsewhere herein. Some embodiments will enable regions to be selected that do not run a full width or length if those elements are edge elements, or possess another such valuable aspect. Thus, as illustrated in the example layout of FIG. 3B, that element 302 can be identified as a section. That section can then be removed from further analysis, and the layout 320 of FIG. 3C analyzed to determine any other elements that run an entire length of an axis. In the layout 320 of FIG. 3C, the left hand section 304 runs the entire y-axis and in the layout 330 of FIG. 3D the primary element 306 runs the entire y-axis as well. Thus, each of these can be considered selectable sections as well. This approach can continue until all regions of the page are accounted for, or until any remaining elements occupy less than a minimum percentage or portion of the content. For example, after determining three of the elements 302, 304, 306 should be designated as sections, there can be two remaining elements 308, 310 as illustrated in FIG. 3E. In some embodiments these may be large enough to also designate as sections, while in others they may be too small. Other approaches can be used as well, such as to allow elements to be designated as sections if the number of sections on a page is below a determined number, etc. In some embodiments, such as PDF documents or images that may not have readily identified sections or elements, other approaches can be used to determine associated regions or elements of the content. These approaches can include, for example, text analysis, image analysis, color analysis, or connected components analysis, among others. In each of these approaches determinations can be made as to regions of similar or related content, and those regions can be processed for potential segmentation. Various patterns corresponding to borders or section breaks can be determined and utilized as well. A machine learning approach can be used in some embodiments to learn which types of content should be grouped together, and a user can have the ability to change the grouping based upon granularity, etc.

In some embodiments, a client computing device (which can include a VR or 3D headset individually or in combination with a smart phone or similar device as discussed elsewhere herein) transmits a request to the service provider that is received at a network based browser. Illustratively, a user can initiate the request by selecting content from the instantiated browser application, via of many possible interfaces. Although described as a single request, the browser components can exchange multiple communications, including for purposes of authentication and for establishing how the browsers will process content. More specifically, the two browser applications may establish a browser configuration that for purposes of the present application can establish whether the browser component will process received content prior to transmitting or whether the browser component will send unprocessed content. For purposes of the discussion, it will be assumed that the browser component of the host environment will process at least a portion of the content. The browser component can process the request. In one aspect, the host browser can function as a proxy application and forward the request from the client browser component to the content provider. In another aspect, the host browser transmits an independent request for content to the content provider. In this embodiment, the host browser can utilize additional or alternative information as part of the request, such as profile information specified by the service provider and networking information completely independent of the client computing device. The host browser transmits the content request to the content provider for processing. The content provider then provides the requested again. Although illustrated as a single request, the browser component host browser and content provider can exchange multiple communications, including for purposes of authentication and security for obtaining the requested content. Additionally, as will be described in detail below, the content provider can either provide an original version of the requested content or content optimized for mobile devices.

The host browser can process the content to replace one or more portions of the static content. The host browser processes the content to identify elements that may correspond to vertical elements or horizontal elements indicative of, or characteristic of, static content. One skilled in the relevant art will appreciate that content to be generated on a display can be provided to a browser application from a content provider in the form of markup language, e.g., HTML, and display information, e.g., cascading style sheets ("CSS"). To process the content, the browser application parses the HTML and CSS information to create a set of tree structures of elements, referred to as a domain object model ("DOM") tree and CSSOM tree. The host browser can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the host browser can utilize one or more methods to identify the render tree elements (DOM tree elements or display objects) that are likely to correspond to vertical or horizontal elements. In a first aspect, the vertical elements can share the characteristic that the height of the vertical element is likely to correspond to the height of the page to be displayed and to be located approximate to the edge of the page. In another aspect, the horizontal elements can share the characteristic that the width of the horizontal element is likely to correspond to the width of the page to be displayed and to be located approximate to the edge of the page. In accordance with the first aspect, the host browser can obtain information regarding the length and width of the render tree elements (or a portion of thereof). Additionally, the host browser can determine from the render tree which of the render tree elements correspond to an edge of the content to be displayed. Utilizing at least these two characteristics, it can be assumed that a vertical element having a height substantially the height of the content (or some specified threshold) and corresponding to an edge is more likely to be static content portion and can be replaced with a visual indicator to create additional space for the dynamic content portion of the content. Similarly, it can be assumed that a horizontal element having a width substantially the width of the content (or some specified threshold) and corresponding to an edge is also more likely to be static content portion and can be replaced with a visual indicator to create additional space for the dynamic content portion of the content.

In a second aspect, the vertical and horizontal elements can share a characteristic that pixel colors of the static portions are likely to contrast with the pixel color of the elements displaying the dynamic content. For example, as a matter of design choice, pixel colors for static portions, such as menu, bars, etc. may be of a darker color than pixel color of content to be presented to a user. In another example, pixel colors utilized static portions of a specified content provider may correspond to a specific color palette associated with branding by the particular content provider. In still a further example, a service provider may obtain usage information (such as user input data or specific user feedback) that identifies static portions and dynamic portions and associates pixel colors based on the determination. Accordingly, a render tree element located at an edge of the content having a specific pixel color from other render tree elements is most likely to correspond to a static portion of content and be identified as a vertical or horizontal element (or element to be replaced).

In one embodiment, the host browser can identify all render tree elements on an edge and conduct a pixel color comparison between the edge render tree elements and adjacent tree elements. The host browser can determine an absolute pixel color difference and compare the difference to a pixel color difference threshold. If the determined difference exceeds the threshold, the host browser can label the edge tree element as a vertical or horizontal render tree element. If the determined difference does not exceed the threshold, the host browser may not be able to determine the render tree element as a vertical or horizontal render tree element.

In another embodiment, the host browser can identify all render tree elements on an edge and conduct a pixel color search to identify render tree elements having a color substantially similar to colors known to correspond to static portions of content. As discussed above, the host browser can illustratively obtain such pixel color information from the content providers or based on usage information. The host browser can then identify vertical or horizontal render tree elements having a substantially similar color. The host browser can replace one or more render tree elements identified as a vertical element or a horizontal element with visual cue. As previously described, in accordance with the present application, the visual cue will provide an indication of a tilt or movement of the computing device that will cause the device to display "hidden" content (e.g., the replaced content). As will be described below, an exemplary visual cue can be an arrow. In some embodiments, the host browser can replace all identified vertical and horizontal elements. In other embodiments, the host browser can selectively replace a subset of vertical or horizontal elements based on preference information. In one example, the preference information can be specified by a user. In another example, the preference information can be specified by the content provider. The preference information can include priority information for replacing vertical elements or horizontal elements or logic rules indicating how much of the render tree elements should be replaced (e.g., utilizing a zoom level to determine a percentage of render tree elements that should be replaced).

To replace the identifier render tree elements, the host browser can maintain render tree elements that corresponds to the visual cue elements. Examples include render tree elements that correspond to a left portion of the content, render tree elements that correspond to a right portion of the content, render tree elements that correspond to a top portion of the content and render tree elements that correspond to a bottom portion of the content. Once the set of render tree elements are identified as vertical elements or horizontal elements, the host browser replaces the identified horizontal elements with either a top visual cue render element or a bottom visual cue render element depending on the respective location of the identified horizontal element in the render tree. Illustratively, the top visual cue render elements and bottom visual cue render elements may include a graphic pointing upward or downward to elicit tilt in that respective direction. In some embodiments, the top and bottom visual cue render elements may correspond to a common graphic (e.g., all up, all down, or a combined up and down) such that a tilt in that direction would correspond to multiple visual cue elements (e.g., a single tilt may cause both the top and bottom elements to be selected). Alternatively, the top and bottom may correspond to opposite graphic (e.g., up and down) to allow for selective control for the user. Additionally, the host browser replaces the identified vertical elements with either a left visual cue render element or a right visual cue render element depending on the respective location of the identified vertical element in the render tree. Illustratively, the left visual cue render elements and right visual cue render elements may include a graphic pointing left or right to elicit tilt in that respective direction. In some embodiments, the left and right may correspond to opposite graphic (e.g., left and right arrows) to allow for selective control for the user. Alternatively, the left and right visual cue render elements may have a common graphic (e.g., all left, all right or a combined left and right arrow) such that a tilt in one direction would correspond to multiple visual cue elements (e.g., a single tilt may cause both the left and right elements to be selected).

The host browser can form the updated content (e.g., with the visual cues) and transmit the updated content to the client browser for rendering. Illustratively, the replacement of the render tree elements will cause the render tree elements corresponding to dynamic portions of the content to be of a greater size in the rendered display. Accordingly, to form the updated content the host browser may reprocess the render tree (or DOM tree or display objects) with the replaced render tree elements to allow for the resizing or adjustment of the remaining render tree elements and incorporation of the new render tree elements. In some embodiments, the removed render tree elements may be transmitted with the updated content. In other embodiments, the host browser may only transmit the removed elements upon request. As will be explained in detail below, upon select input from a user, the host browser can update the content again by restoring one or more the render tree elements that we had been previously removed. After rendering, the client browser can monitor for user inputs related to an orientation or tilt of the device (or change thereof). Illustratively, the client computing device can utilize the input from one or more accelerometer to determine orientation or tilt. If such user input is detected, the browser component can associate the tilt input with one or more of the visual cues. Illustratively, the browser component can then request or provide the removed render tree elements and generated updated content with the restored render tree elements. Illustratively, the restoration of the render tree elements will cause the render tree elements corresponding to dynamic portions of the content to be of a smaller size in the rendered display. Accordingly, to form the updated content (or second updated content) the host browser may reprocess the render tree (or DOM tree or display objects) with one or more of the restored render tree elements to allow for the resizing or adjustment of the remaining render tree elements and incorporation of the new render tree elements. As previously described, the local client browser may already have the hidden display elements or request the elements from the host browser. The process can be repeated. Additionally, in some embodiments, the user can utilize the same controls to re-hide the static portions.

In another example interaction for an alternative embodiment, a client computing device can transmit a request directly to the content provider without interaction with the host browser. Illustratively, a user can initiate the request by selecting content from the instantiated browser application, via of many possible interfaces. The content provider can provide the requested content again. Although illustrated as a single request, the client browser and content provider can exchange multiple communications, including for purposes of authentication and security for obtaining the requested content. Additionally, as will be described in detail below, the content provider can either provide an original version of the requested content or content optimized for mobile devices. In this embodiment, the client browser will process the content to replace one or more portions of the static content. The client browser processes the content to identify elements that may correspond to vertical elements or horizontal elements indicative of, or characteristic of, static content. One skilled in the relevant art will appreciate that content to be generated on a display can be provided to a browser application from a content provider in the form of markup language, e.g., HTML, and display information, e.g., cascading style sheets ("CSS"). To process the content, the browser application parses the HTML and CSS information to create a set of tree structures of elements, referred to as a domain object model ("DOM") tree and CSSOM tree. The client browser can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the client browser can utilize one or more methods to identify the render tree elements that are likely to correspond to vertical or horizontal elements. In one aspect, the vertical elements can share the characteristic that the height of the vertical element is likely to correspond to the height of the page to be displayed and to be located approximate to the edge of the page. In another aspect, the horizontal elements can share the characteristic that the width of the horizontal element is likely to correspond to the width of the page to be displayed and to be located approximate to the edge of the page. In a separate aspect, the vertical and horizontal elements can share a characteristic that the pixel colors of the static portions are likely to contrast with the pixel color of the elements displaying the dynamic content. Accordingly, a continuous edge display having a contrasted color from the center elements is most likely to correspond to a bar or a menu based on common design implementations. In one example, the client browser can replace one or more render tree elements identified as a vertical element or a horizontal element with visual cue. As previously described, in accordance with the present application, the visual cue will provide an indication of a tilt or movement of the computing device that will cause the device to display "hidden" content (e.g., the replaced content). As will be described below, an exemplary visual cue can be an arrow. In some embodiments, the client browser can replace all identified vertical and horizontal elements. In other embodiments, the client browser host browser can selectively replace a subset of vertical or horizontal elements based on preference information. In one example, the preference information can be specified by a user. In another example, the preference information can be specified by the content provider. The preference information can include priority information for replacing vertical elements or horizontal elements or logic rules indicating how much of the render tree elements should be replaced (e.g., utilizing a zoom level to determine a percentage of render tree elements that should be replaced).

The client browser can form the updated content (e.g., with the visual cues) and transmits the updated content to the client browser for rendering. After rendering, the client browser monitors for user inputs related to an orientation or tilt of the device (or change thereof). Illustratively, the client computing device can utilize the input from one or more accelerometer to determine orientation or tilt. If such user input is detected, the browser component can associate the tilt input with one or more of the visual cues. Illustratively, the browser component can request or provide the removed elements and generated updated content with the restored display elements. The process can be repeated. Additionally, in some embodiments, the user can utilize the same controls to re-hide the static portions.

In an example render tree processing routine, either the host browser or client browser can obtain content from the content provider. Accordingly, the routine will be described generally with regard to implementation by a browser application. The browser component determines a set of elements for rendering. As previously described, one skilled in the relevant art will appreciate that content to be generated on a display can be provided to a browser application from a content provider in the form of markup language, e.g., HTML, and display information, e.g., cascading style sheets ("CSS"). To process the content, the browser application parses the HTML and CSS information to create a set of tree structures of elements, referred to as a domain object model ("DOM") tree and CSSOM tree. The host browser can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the browser component processes the content to identify render tree elements that may correspond to vertical elements or horizontal elements indicative of, or characteristic of, static content. Illustratively, the host browser can utilize one or more methods to identify the render tree elements that are likely to correspond to vertical or horizontal elements. The routine enters into a loop to process all the display elements by selecting the next element. The browser processes the set of elements to identify horizontal elements.

Illustratively, the horizontal elements can share the characteristic that the width of the horizontal element is likely to correspond to the width of the page to be displayed and to be located approximate to the edge of the page. An illustrative sub-routine for determining horizontal elements will be described below. However, as previously described, there may be alternative methodologies to identify horizontal elements, including the utilization of pixel color analysis. Accordingly, in this alternative embodiment, the horizontal elements can share the characteristic of having an pixel color difference relative to adjacent render tree elements exceeding a threshold or being associated with a pixel color known (or assumed) to correspond to a horizontal render tree element.

The browser component can determine the current element width. The browser determines whether the element width corresponds to a threshold width. Illustratively, the threshold width can correspond to substantially the width of the page to be rendered. If it is determined that the current element width is not above the threshold, the browser can determine that the element is not likely static content and the subroutine returns. Alternatively, if the browser determines that the current element width is above the threshold, a test can be conducted to determine whether the element corresponds to an edge element. If it is determined that the element is not at the edge, the browser can determine that the element is not likely static content and the subroutine returns. Alternatively, if the browser determines that the element is an edge, at the browser can designate the target for replacement. The browser can also process the set of elements to identify vertical elements. Illustratively, the vertical elements can share the characteristic that the height of the vertical element is likely to correspond to the height of the page to be displayed and to be located approximate to the edge of the page. An illustrative sub-routine for determining vertical elements will be described below. However, as previously described, there may be alternative methodologies to identify vertical elements, including the utilization of pixel color analysis. Accordingly, in this alternative embodiment, the vertical elements can share the characteristic of having an pixel color difference relative to adjacent render tree elements exceeding a threshold or being associated with a pixel color known (or assumed) to correspond to a horizontal render tree element. In some embodiments, the thresholds or known pixel colors may be different for the vertical and horizontal render tree elements. The browser component can determine the current element height, and can determine whether the element height corresponds to a threshold height. Illustratively, the threshold height can correspond to substantially the height of the page to be rendered. If it is determined that the current element height is not above the threshold, the browser can determine that the element is not likely static content and the subroutine returns. Alternatively, if the browser determines that the current element height is above the threshold, a test can be conducted to determine whether the element corresponds to an edge element. If it is determined that the element is not at the edge, the browser can determine that the element is not likely static content and the subroutine returns. Alternatively, if the browser determines that the element is an edge, the browser can designate the target for replacement at block.

Another test can be conducted to determine whether additional elements should be processed. If so, the routine processes the next element in the set of elements. If no additional elements exist, the browser can replace one or more identified as a vertical element or a horizontal element with visual cue. As previously described, in accordance with the present application, the visual cue will provide an indication of a tilt or movement of the computing device that will cause the device to display "hidden" content (e.g., the replaced content). Illustratively, the replacement of the render tree elements will cause the render tree elements corresponding to dynamic portions of the content to be of a greater size in the rendered display. Accordingly, to form the updated content the host browser may reprocess or create a new render tree (or DOM tree or display objects) with the replaced render tree elements to allow for the resizing or adjustment of the remaining render tree elements and incorporation of the new render tree elements.

As will be described below, an exemplary visual cue can be an arrow that suggests a path of movement or tilt to access content not currently rendered on the display screen. In some embodiments, the host browser can replace all identified vertical and horizontal elements. In other embodiments, the host browser host browser can selectively replace a subset of vertical or horizontal elements based on preference information. In one example, the preference information can be specified by a user. In this embodiment, the host browser can maintain local preference information that provides the preference information for identifying or replacing vertical and horizontal elements. In another example, the host browser can utilize various interfaces to request the preference information from a service. The preference information can also include performance information provided by the client computing device, such as screen size, processing resources, zoom levels, touch sensitivity, accelerometer sensitivity that can affect which content is replaced. For example, the host browser may implement logic rules to replace all identified render tree elements if a zoom level is above 100 percent. In another example, the host browser may implement logic rules to replace only vertical render tree elements if the accelerometer sensors are configured such that only a left or right tilt input is enabled. One skilled in the relevant art will appreciate that additional or alternative examples or processing rules could also be applied.

In another example, the preference information can be specified by the content provider. The preference information may be included in the transmitted content, such as meta-data or obtained utilizing the interfaces to request the preference information. The preference information can include priority information for replacing vertical elements or horizontal elements or logic rules indicating how much of the render tree elements should be replaced (e.g., utilizing a zoom level to determine a percentage of render tree elements that should be replaced).

As mentioned, such approaches can be beneficial not only for websites but for other types of content as well. Any type of content that has regions or portions of related content can potentially benefit from such approaches. In these examples the content to be displayed can be inspected dynamically using approaches discussed and suggested herein. The content can include, for example, e-books, digital documents, image collections, folder and file managers, and the like.

Figure 4:
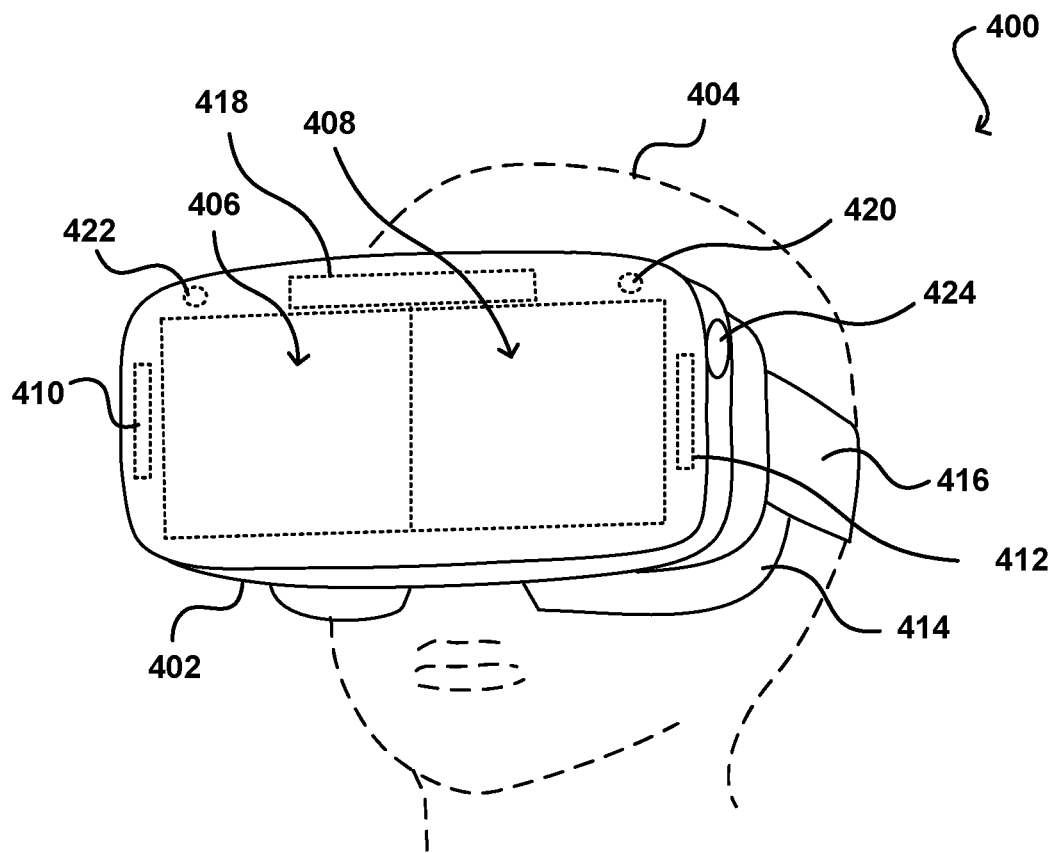
FIG. 4 illustrates an example VR device that can be used to implement aspects of the various embodiments.
Figure 4:
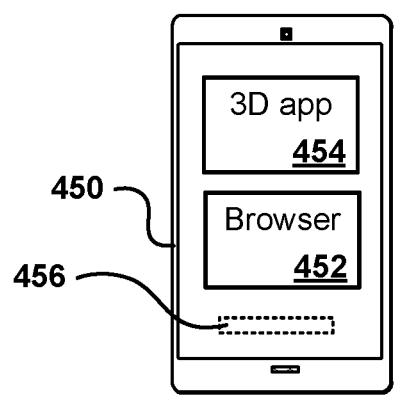

FIG. 4 illustrates an example headset 400 that can be utilized in accordance with various embodiments. The example device 400 can include a pair of displays, one for each eye of the user, or can utilize a logically segmented single display, wherein each half of the display will display content for a respective eye of the user, among other such options. Alternating shuttered displays and other such options can be used to provide the necessary disparity for 3D or VR viewing in accordance with various embodiments. As known for such devices, a different view is typically rendered and/or displayed for each of the user's eyes, with each view being slightly different due to the difference in locations of the user's eyes. The pupillary distance (or other measure of physical separation or relative locations of the user's eyes) between the user's eyes causes objects to be viewed from slightly different angles, with the difference in angle depending at least in part upon the distance from the object to the user's eyes. This varying angle with distance, which results in a different apparent lateral separation between representations of objects in the left and right images, is typically referred to as disparity. Objects at "infinity" will have representations appear at approximately the same pixel location in each image because the difference in angle will be approximately zero degrees. As objects get closer, the angular difference between the locations of the object with respect to each eye will increase, such that the difference in pixel location(s) of the object representation will increase between the two images. For example, an object close to the user's eyes will appear to be significantly further to the left (e.g., 100 pixels further to the left of center) in the right eye image than the representation of that object in the left eye image.

When rendering a scene, this difference in angle with disparity can be used to render the same scene from two different points of view. For web content each panel can be rendered with a different amount of disparity to cause the panels to appear to be at different depths or distances with respect to the user. For a 3D environment or virtual reality example, there can be a virtual model (i.e., a wire frame or mesh model) of the surrounding environment, and the relative "position" of each eye in the scene can be used as a point of reference from which to render the scene for each of the left eye image and the right eye image, which will result in the appropriate amount of disparity between views. For each image, the view of the virtual three-dimensional (3D) model can be determined, then the appropriate textures and lighting applied (as known for such purposes) to render the scene from the two different viewpoints. The left and right eye images can be displayed concurrently, using two separate display screens or portions of a single display screen, or in alternating sequence, with a virtual shutter or other such element causing the left and right eyes to alternatively be able to view the content when the corresponding image is displayed. Such a process provides the 3D appearance of the environment. A virtual reality device typically also includes some type of motion and/or orientation detection sensor, such as an accelerometer, gyroscope, electronic compass, inertial sensor, magnetometer, and the like, which can provide data as to movement of the virtual reality device resulting from movement of the user's head, in general. The point of view and direction can thus be updated with movement of the device such that the views presented to the user correspond to the expected view based on the user movement. The views can be re-rendered and displayed at an appropriate rate, such as thirty or sixty frames per second, such that the user can feel as if the user is actually in the virtual environment based on the combination of the appropriate rendering with changes in user head orientation, etc.

While FIG. 4 illustrates an example virtual reality device 400, it should be understood that various other types of devices, such as smart glasses, goggles, and other virtual reality displays and devices can be used as well within the scope of the various embodiments. In this example, the device includes a housing 402 made of a material such as plastic with a polymer lip 414 or other such portion intended to contact the user's face in order to provide for comfort of the user as well as providing a relatively light-tight seal to prevent extraneous light from passing to the user's eyes while wearing the device. Various other materials can be utilized as well, as may include aluminum, carbon fiber, or cardboard, among other such options. The example device also includes a strap 416 or other such mechanism for securing the device to the user's head, particularly while the user's head 404 is in motion. The example device includes a left eye display screen 408 and a right eye display screen 406, although as mentioned in some embodiments these can be portions of a single display screen or arrays of multiple screens, or holographic displays, among other such options. In some embodiments a single display element will be used with respective convex lenses for each eye and one or more separation elements that limit the field of view of each eye to a designated portion of the display. The device will typically include display circuitry 418, as may include memory, one or more processors and/or graphics processors, display drivers, and other such components known or used for generating a display of content. There can be a single set of circuitry for both displays 406, 408 or at least some of the components can be duplicated for each display such that those components only provide for display of content on one screen or the other. The display screens can be any appropriate type of display, such as an AMOLED or LED display with sufficient refresh rate for virtual reality applications. The device includes one or more motion and/or orientation sensors 410, as may include at least one accelerometer, magnetometer, gyroscope, electronic compass, inertial sensor, and/or other such sensor for providing data about rotation, translation, and/or other movement of the device. The motion and/or orientation data can be used to determine the appropriate point of view (POV) from which to render the current scene of content. The example device also includes at least one communication component 412, such as a wired or wireless component for transmitting data over a protocol such as Bluetooth, Wi-Fi, 4G, and the like. The communication component can enable the device 400 to communicate with a computing device for purposes such as obtaining content for rendering, obtaining additional input, and the like. The example device can include other components as well, such as battery or power components, speakers or headsets, microphones, etc.

The example device 400 can also include one or more cameras 220, 222 or other image capture devices for capturing image data, including data for light reflected in the ambient or infrared spectrums, for example. One or more cameras can be included on an exterior of the device to help with motion tracking and determining environmental conditions. For example, locations of light sources, intensity of surrounding ambient light, objects or persons nearby, or any of various other objects or conditions can be determined that can be incorporated into the virtual reality scene, such as to make the lighting environmentally appropriate or to include things located around the user, among other such options. As mentioned, tracking the motion of objects represented in the captured image data can help with motion tracking as well, as rotation and translation data of surrounding objects can give an indication of the movement of the device itself. As illustrated, the example headset 400 includes a single input button 424 that the user can press to provide input to the headset, including any smart phone 450 or other computing device located within, or separate from, the headset. As illustrated, the headset in some embodiments can communicate with a computing device 450, while in other embodiments the computing device may be positioning within the housing 402 and used to provide the display.

As mentioned herein, the client device can include various components such as a browser application 452 for rendering a webpage, which can function alone or in combination with a 3D/VR application or plugin 454 that can provide the appropriate disparity and other information for the display. If the computing device 450 communicates with the headset then the device can include at least one communications component that can communicate via wired or wireless communication (e.g., Bluetooth or WiFi) with the headset 400.

Figure 5:
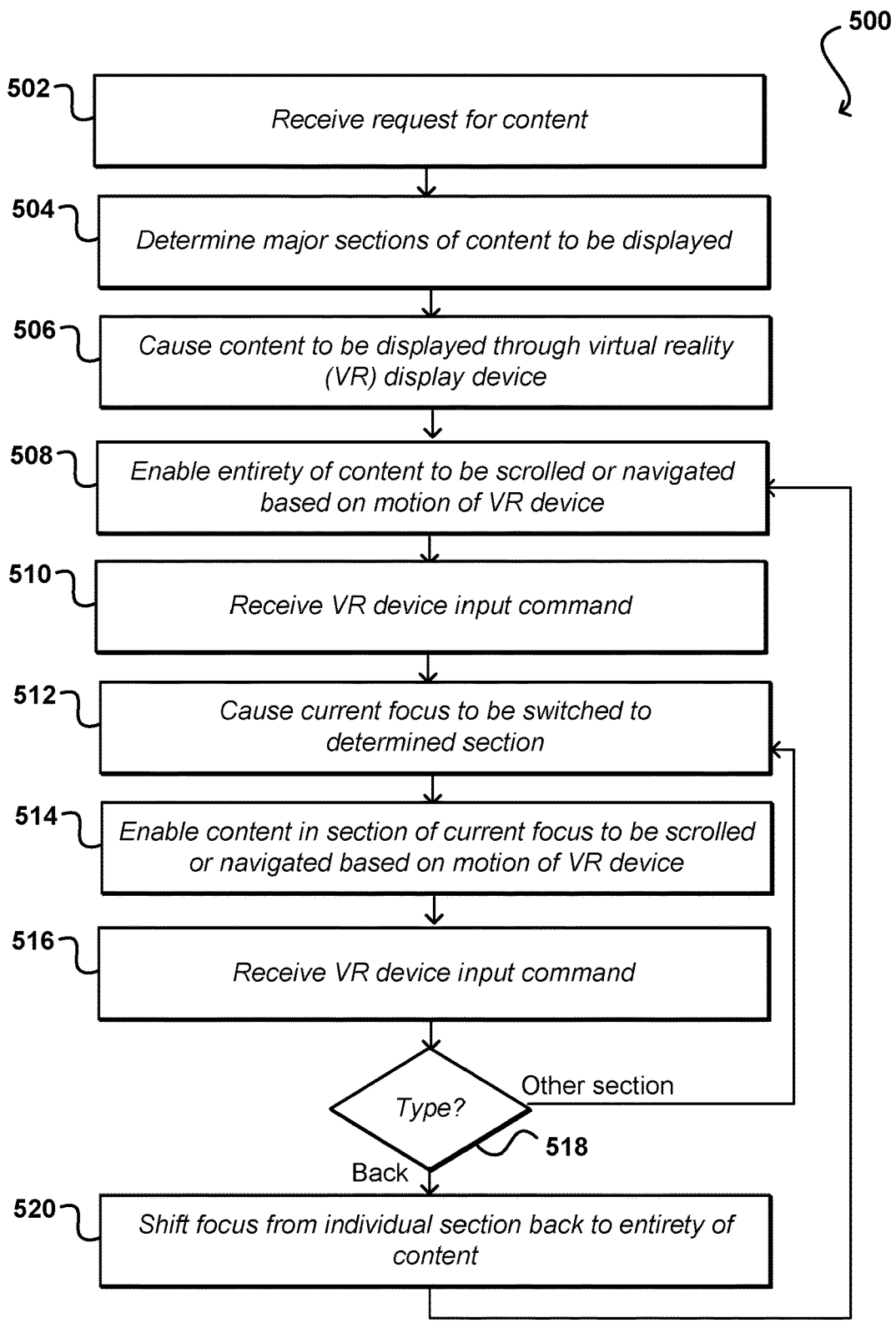
FIG. 5 illustrates an example process for enabling navigation of content via a VR device that can be utilized in accordance with various embodiments.

FIG. 5 illustrates an example process 500 for enabling a user to navigate content using a 3D or VR headset that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request for content to be displayed via the headset is received 502. As mentioned, the headset may include processing and communications capability, or may be a passive device in which a smart device can be positioned, such that the request can be received from the headset, a device positioned within the headset, or a computing device in communication with the headset, among other such options. Further, while the term headset is used it should be understood that various other types of devices can be utilized as well as discussed and suggested elsewhere herein. The major (or determined to be significant) sections of the content to display can be determined 504 as discussed herein using a dynamic or offline process, for example, and the content can be caused 506 to be displayed through the VR display device (or other such device or system).

As mentioned, in many embodiments the content as initially displayed will be displayed in a default rendering wherein none of the sections are currently a focus of the display (other than where the user is looking or a cursor is positioned, etc.). In this layout where none of the sections are the current focus, the entirety of the content (or display of that content) can be enabled 508 to be scrolled, navigated, or otherwise manipulated based at least in part upon the motion of the VR device. This can include, for example, changes in orientation that are detected by one or more orientation or motion sensors of the VR device or a smart device connected to the VR device. During the display, a VR device input can be received 510. This can include, for example, the detection of a user selection of a single button input or other such action. Other inputs can potentially include voice input, gesture input, specific motion input, and the like. The determination of the single input can cause 512 the current focus to be switched to a determined section of the content. In some embodiments a cursor position can determine the appropriate section, while in other embodiments a section order can be determined whereby a single input press (or direction of the press or motion, etc.) can cause the focus to switch to the next section in the order. Various other determinations can be made as well as discussed and suggested elsewhere herein. As mentioned, in some embodiments the section of current focus might be highlighted, brought to a rendered foreground, or otherwise identified. The content of the section of current focus can also be enabled 514 to be scrolled, navigated, or otherwise manipulated based upon motion of the VR device, etc., as discussed previously. Subsequently, another VR device input command can be received 516 or otherwise determined, and a determination can be made 518 as to the type of input. For example, a double tab of the input button might indicate to back out of the section of current focus, while a single touch with a positioned cursor might indicate to go to an indicated or next section, among other such options. If the input is an input to back out of the current section then the focus can be shifted 520 from the individual section based to the entirety of the content (i.e., the default display state). If the input is to shift the focus to another section, then the current focus can be caused to be switched to the determined section as discussed above.

Figure 6:
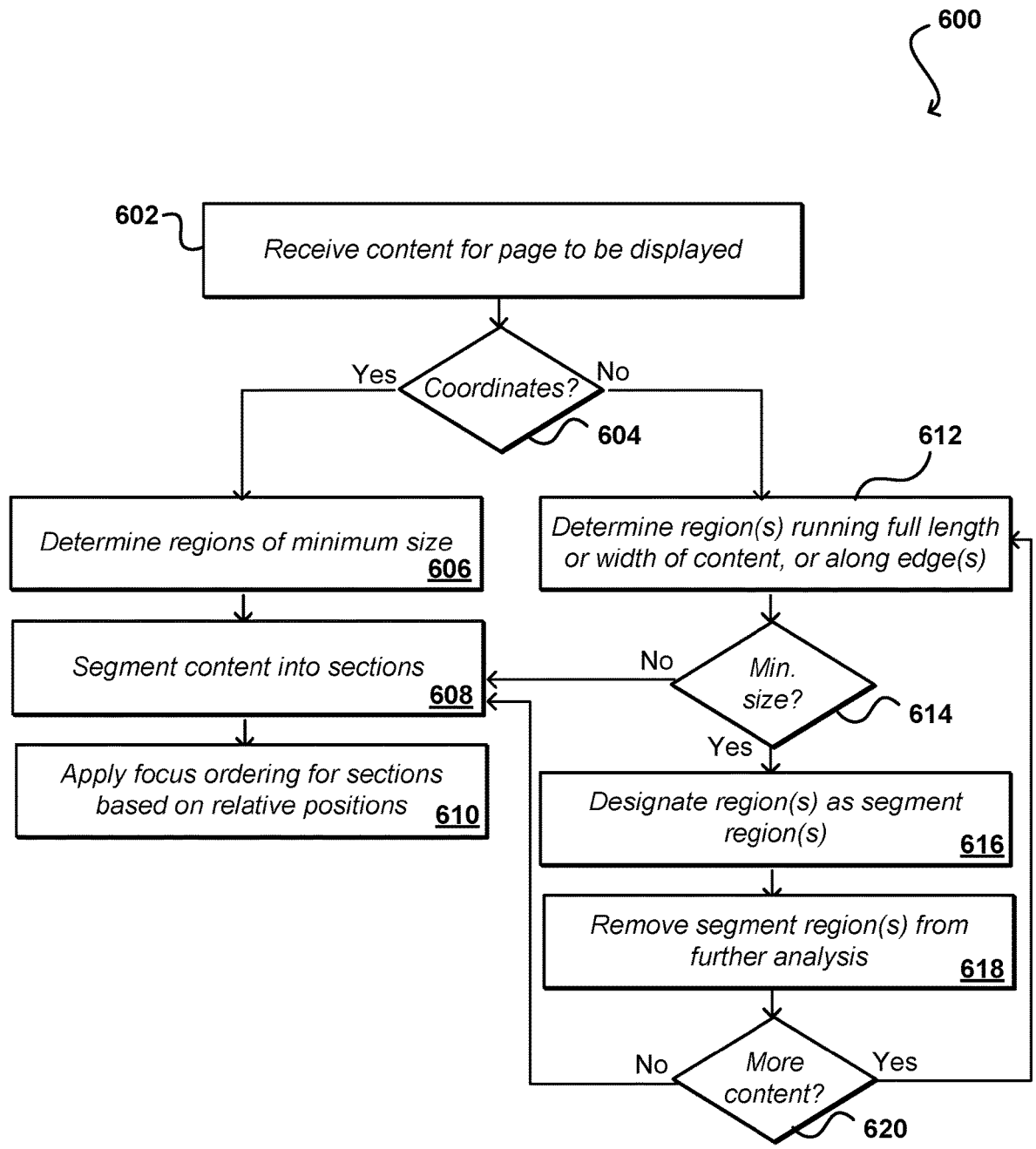
FIG. 6 illustrates an example process for segmenting content that can be utilized in accordance with various embodiments.

FIG. 6 illustrates an example process 600 for determining selectable sections of an instance of content that can be utilized in accordance with various embodiments. In this example, the content for a page to be displayed through a VR or 3D device is received 602 or otherwise obtained or identified. A determination can be made 604 as to whether coordinate, dimension, or other sizing information for various elements or areas is included with, or otherwise specified for, the content. This can include, for example, coordinate information being provided with the nodes of a DOM tree for the content, among other such options. If dimension or coordinate information is provided then regions having at least a minimum size (e.g., minimum area, height, and/or width in terms of pixels) can be determined 606 and the content segmented 608 into sections based on regions satisfying the minimum size criterion. If dimension information is not provided, then the content can be analyzed to identify or otherwise determine 612 regions of the content that run a full length (i.e., in the y-direction) or width (i.e., in the x-direction) of the content when displayed. Similarly, other factors can be used to determine whether a region should be designated as a selectable section as well, such as whether the region starts at a corner of the display and/or runs along an edge of the display, among other such options. In at least some embodiments, a determination can be made 614 as to whether any of these regions at least meet a minimum size requirement. Once no more regions are identified that meet the minimum size criterion, the content can be segmented using the determined segments. If the identified segments at least meet the minimum size criterion, then those segments can be designated 616 as segment regions and removed 618 from consideration or further analysis, such that only the remaining portions of the content will be analyzed to determine which regions run a width or length of the remaining content, etc. If it is determined 620 that there is additional content to be analyzed, then the process can continue. Otherwise the content can be segmented according to the determined sections, as may involve injecting tags or values in the content or associating a file including such information. If the segmentation is being performed dynamically, the values can be maintained in memory for rendering purposes. Once the segmentation is performed, the sections can be individually selected in order to enable the user to focus on, and navigate within, the individual sections. As mentioned, in some embodiments a section ordering can be applied 610 such that a user can potentially cycle through the various sections in the determined order instead of relying upon a positioning of a cursor or other such approach.

Figure 7:
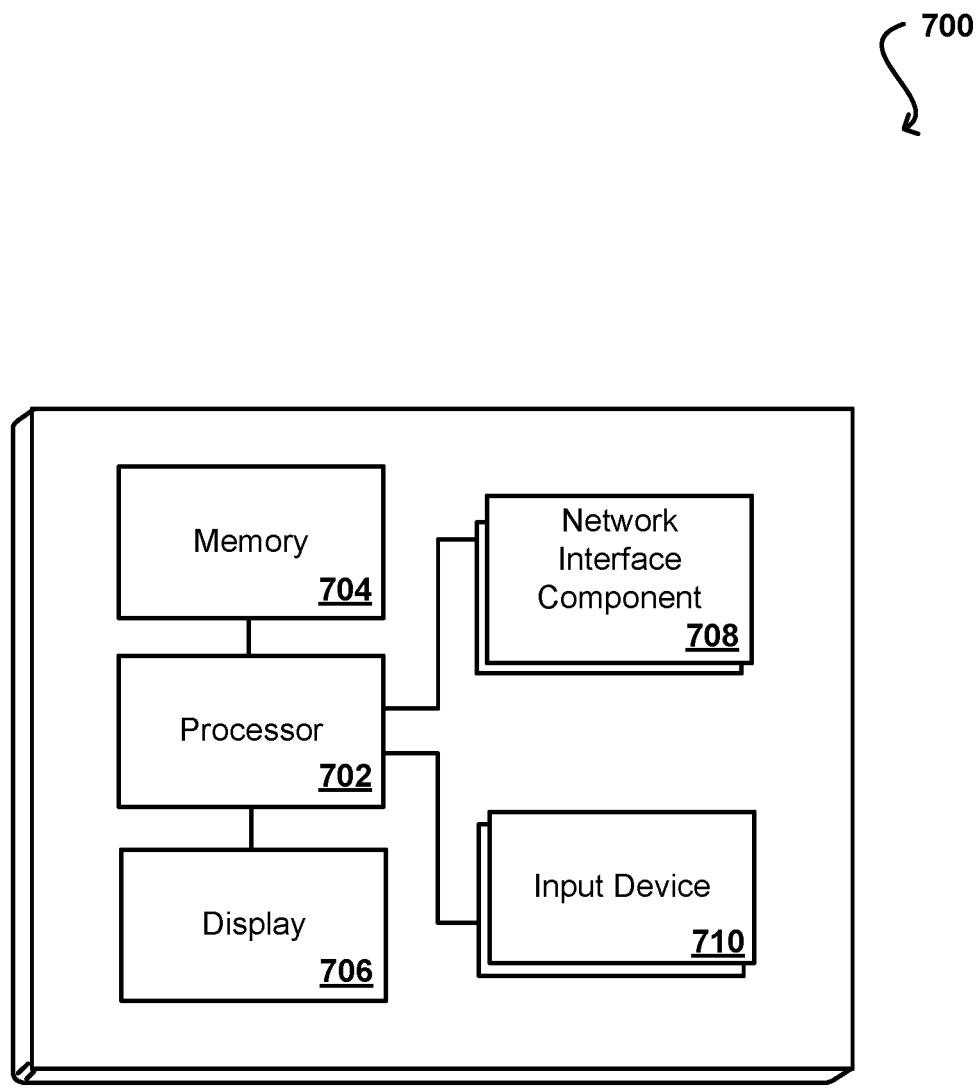
FIG. 7 illustrates example components of a computing device that can be utilized in accordance with various embodiments.

FIG. 7 illustrates a logical arrangement of a set of general components of an example computing device 700 that can be used to implement aspects of the various embodiments. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface components 708 for communicating over various networks, such as a Wi-Fi, Bluetooth, RF, wired, or wireless communication systems.

The device in many embodiments can communicate with a network, such as the Internet, and may be able to communicate with other such devices.

Figure 8:
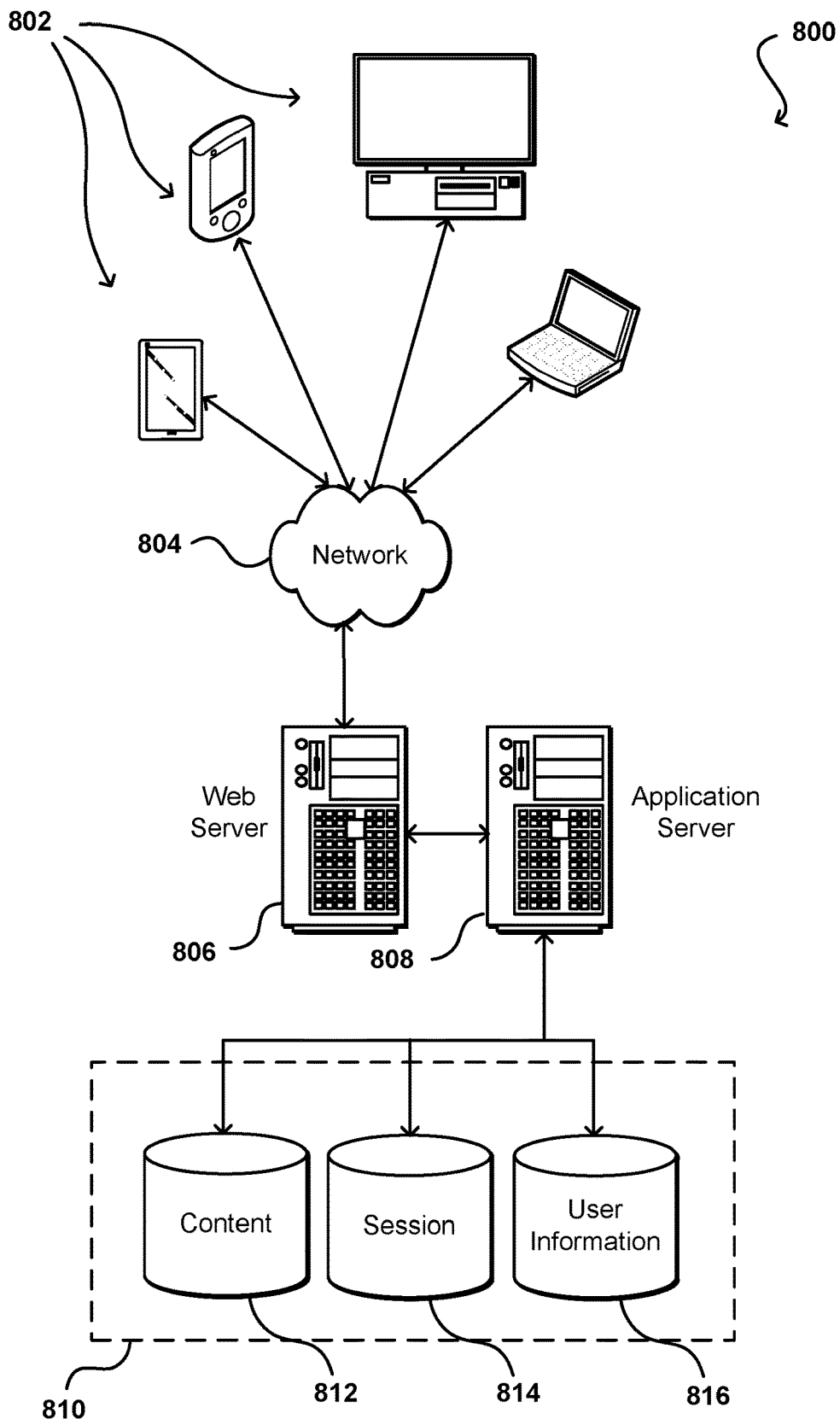
FIG. 8 illustrates an example environment in which aspects of the various embodiments can be implemented.

As discussed, different approaches can be implemented in various environments in accordance with the described embodiments. For example, FIG. 8 illustrates an example of an environment 800 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining content to be displayed through a three-dimensional (3D) display device;

analyzing the content to determine a plurality of regions of related content;

identifying two or more regions of the plurality of regions as selectable sections based at least in part upon the two or more regions satisfying at least one sectioning criterion;

causing the content to be displayed through the 3D display device;

enabling navigation of the content through changes in orientation of the 3D display device, wherein said navigation comprises changes to a primary view direction with respect to the displayed content;

detecting user input using a single physical input of the 3D display device, the single physical input comprising a tactile input;

determining a current section, of the selectable sections, to have a current focus on the 3D display device, the current section determined based at least in part on the primary view direction when the user input is detected;

causing the content, except for the current section, to be displayed at an increased distance and with increased blur with respect to the current section, the increased distance and increased blur being different than an initial distance and initial blur;

causing the content of the increased distance and increased blur, different from the current section, to be hidden and replaced with a visual cue, the visual cue providing an indication for retrieval of the replaced content hidden by the current section and visual cue;

disabling navigation of the content, except for the current section having the current focus, through the changes in the orientation of the 3D display device, wherein the changes in the orientation cause a display of the current section to be updated while regions of the content different than the current section are displayed without modification;

detecting a second user input using the single physical input of the 3D display device; and causing the current section to no longer have the current focus on the 3D display device, wherein navigation of the displayed content is re-allowed through changes in orientation of the 3D display device.

2. The computer-implemented method of claim 1, further comprising:

determining that the selectable sections each satisfy the at least one sectioning criterion by the two or more regions each having at least one of a minimum size, extending along an edge of the content, extending a full length or width of the content, corresponding to a section tag, corresponding to a type of content node, or corresponding to an identified sectioning pattern.

3. The computer-implemented method of claim 1, further comprising:

generating for display a crosshair indicating a location of the primary view direction with respect to the displayed content; and enabling a selection of an element of the displayed content, using the single physical input, when a displayed position of the crosshair corresponds to a displayed location of the element.

4. A computer-implemented method, comprising:

determining content to be rendered using a three-dimensional (3D) display device, the content being two-dimensional content;

analyzing the content to determine a plurality of distinct regions;

identifying two or more distinct regions of the plurality of distinct regions as selectable sections based at least in part upon the two or more distinct regions satisfying at least one sectioning criterion;

providing the content for display through the 3D display device, a primary view direction adjusted by changes in orientation of the 3D display device;

determining a current section based at least in part on the primary view direction when a first input is detected, the first input provided via a tactile interaction with a single physical input;

causing the content, except for the current section, to be displayed at an increased distance and with increased blur with respect to the current section, the increased distance and increased blur being different than an initial distance and initial blur;

causing the content of the increased distance and increased blur, different from the current section, to be hidden and replaced with a visual cue, the visual cue providing an indication for retrieval of the replaced content hidden by the current section and visual cue;

enabling navigation of the current section based on changes in orientation of the 3D display device while a separate region is not navigated and is displayed;

detecting a second user input using the single physical input of the 3D display device; and causing the current section to no longer have a current focus on the 3D display device, wherein navigation of the displayed content including the current section and the separate region is allowed through changes in orientation of the 3D display device.

5. The computer-implemented method of claim 4, wherein the 3D display device includes a headset configured to house a portable computing device, wherein changes in orientation of the 3D display device are detected using one or more sensors of the portable computing device, and wherein the content is displayed using a display screen of the portable computing device, portions of the display screen being limited to viewing by respective eyes of a user wearing the headset.

6. The computer-implemented method of claim 4, further comprising:

determining the plurality of distinct regions based on the plurality of distinct regions corresponding to specific section tags, having related content, being identified using a connected components algorithm, being separated by space or borders, or corresponding to an identified region pattern.

7. The computer-implemented method of claim 4, further comprising:

identifying two or more of the plurality of distinct regions as selectable sections satisfying at least one sectioning criterion by the selectable sections having at least one of a minimum size, extending along an edge of the content, or extending a full length or width of the content.

8. The computer-implemented method of claim 4, further comprising:

determining an ordering of the selectable sections, wherein the single physical input can be used to cycle through the selectable sections as current sections of focus.

9. The computer-implemented method of claim 4, wherein the content corresponds to a webpage, electronic book, or electronic document.

10. The computer-implemented method of claim 4, further comprising:

detecting a hold of the single physical input for at least a minimum length of time;

adjusting the at least one sectioning criterion; and determining a new set of selectable sections for the content.

11. The computer-implemented method of claim 4, further comprising:

generating for display a pointer indicating a location of the primary view direction with respect to the displayed content; and enabling a selection of an element of the displayed content, using the single physical input, when a displayed position of the pointer corresponds to a displayed location of the element.

12. A system, comprising:

at least one processor; and at least one memory including instructions that, when executed by the at least one processor, cause the system to:

determine content to be rendered using a three-dimensional (3D) display device;

analyze the content to determine a plurality of distinct regions;

identify two or more distinct regions of the plurality of distinct regions as selectable sections based at least in part upon the two or more distinct regions satisfying at least one sectioning criterion;

provide the content for display through the 3D display device, a primary view direction adjusted by changes in orientation of the 3D display device;

determine a current section based at least in part on the primary view direction when a first input is detected, the first input provided via a tactile interaction with a single physical input;

cause the content, except for the current section, to be displayed at a smaller size and with increased blur with respect to the current section, the smaller size and increased blur being different than an initial size and initial blur;

cause the content of the increased distance and increased blur, different from the current section, to be hidden and replaced with a visual cue, the visual cue providing an indication for retrieval of the replaced content hidden by the current section visual cue;

allow navigation of the current section based on changes in orientation of the 3D display device while remaining selectable sections are provided for display and not navigated;

detect a second user input using the single physical input of the 3D display device; and cause the current section to no longer have a current focus on the 3D display device, wherein navigation of the displayed content including the current section is allowed through changes in orientation of the 3D display device.

13. The system of claim 12, wherein the instructions when executed further cause the system to:

identify two or more of the plurality of distinct regions as selectable sections satisfying at least one sectioning criterion by the selectable sections having at least one of a minimum size, extending along an edge of the content, or extending a full length or width of the content.

14. The system of claim 12, wherein the instructions when executed further cause the system to:

generate for display a pointer indicating a location of the primary view direction with respect to the displayed content; and allow a selection of an element of the displayed content, using the single physical input, when a displayed position of the pointer corresponds to a displayed location of the element.

* * * * *